United States Patent
Wang et al.

(10) Patent No.: US 12,267,772 B2
(45) Date of Patent: Apr. 1, 2025

(54) METHOD AND APPARATUS FOR MANAGING NETWORK SLICE FOR TERMINAL DEVICE

(71) Applicant: Telefonaktiebolaget LM Ericsson (publ), Stockholm (SE)

(72) Inventors: Cheng Wang, Shanghai (CN); Ping Chen, Shanghai (CN); Xiao Li, Shanghai (CN); Huiwei Zheng, Shanghai (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 376 days.

(21) Appl. No.: 17/611,336

(22) PCT Filed: May 12, 2020

(86) PCT No.: PCT/CN2020/089778
§ 371 (c)(1),
(2) Date: Nov. 15, 2021

(87) PCT Pub. No.: WO2020/228698
PCT Pub. Date: Nov. 19, 2020

(65) Prior Publication Data
US 2022/0240173 A1 Jul. 28, 2022

(30) Foreign Application Priority Data
May 15, 2019 (WO) ................ PCT/CN2019/087050

(51) Int. Cl.
H04W 48/18 (2009.01)
H04W 40/24 (2009.01)

(52) U.S. Cl.
CPC .......... *H04W 48/18* (2013.01); *H04W 40/248* (2013.01)

(58) Field of Classification Search
CPC ............................. H04W 48/18; H04W 40/248
See application file for complete search history.

(56) References Cited

U.S. PATENT DOCUMENTS

2019/0029065 A1  1/2019 Park et al.
2019/0053104 A1* 2/2019 Qiao ..................... H04M 15/66
(Continued)

FOREIGN PATENT DOCUMENTS

CN   106572517 A   4/2017
CN   108833181 A   11/2018
(Continued)

OTHER PUBLICATIONS

First Office Action for Chinese Patent Application No. 202080035769.0, mailed Apr. 21, 2023, 15 pages.
(Continued)

*Primary Examiner* — Kevin C. Harper
*Assistant Examiner* — Salma Ayad
(74) *Attorney, Agent, or Firm* — Withrow & Terranova, PLLC

(57) ABSTRACT

Embodiments of the present disclosure relate to a method and an apparatus for managing network slice for terminal device. A first aspect of the present disclosure provides a method performed at a server function, comprising: determining to change a network slice for a terminal device; and transmitting, to an exposure function, a request to change the network slice for the terminal device. According to embodiments of the present disclosure, a server may be able to change the network slice for a terminal device.

16 Claims, 11 Drawing Sheets

---

Server Function
(AF 100)

---

S 103
Transmit, to the exposure function, a request for updating a UE route selection policy, URSP, or a network slicing selection policy, NSSP for the terminal device; UE refers to user equipment.

(56) References Cited

U.S. PATENT DOCUMENTS

| | | | |
|---|---|---|---|
| 2019/0059074 A1* | 2/2019 | Ozturk | H04W 12/76 |
| 2019/0306251 A1* | 10/2019 | Talebi Fard | H04W 76/10 |
| 2019/0313236 A1* | 10/2019 | Lee | H04W 88/023 |
| 2020/0014589 A1* | 1/2020 | Xu | H04L 41/342 |
| 2020/0196130 A1* | 6/2020 | Tamura | H04W 8/02 |
| 2021/0092634 A1* | 3/2021 | Kang | H04W 28/04 |
| 2021/0144619 A1* | 5/2021 | Prakash | H04W 48/08 |
| 2022/0022029 A1* | 1/2022 | Di Girolamo | H04W 4/50 |
| 2022/0159605 A1* | 5/2022 | Li | H04W 76/10 |

FOREIGN PATENT DOCUMENTS

| | | | | |
|---|---|---|---|---|
| WO | WO-2017173259 A1 * | 10/2017 | | H04W 4/50 |
| WO | WO-2018170922 A1 * | 9/2018 | | H04L 41/0806 |

OTHER PUBLICATIONS

Author Unknown, "Technical Specification Group Services and System Aspects; System Architecture for the 5G System; Stage 2 (Release 16)," Technical Specification 23.501, Version 16.0.1, Apr. 2019, 3GPP Organizational Partners, 317 pages.

Author Unknown, "Technical Specification Group Services and System Aspects; Procedures for the 5G System; Stage 2 (Release 16)," Technical Specification 23.502, Version 16.0.2, Apr. 2019, 3GPP Organizational Partners, 419 pages.

Author Unknown, "Technical Specification Group Services and System Aspects; Study on Enhanced IMS to 5GC Integration (Release 16)," Technical Specification 23.794, Version 1.0.0, Mar. 2019, 3GPP Organizational Partners, 83 pages.

Extended European Search Report for European Patent Application No. 20806590.4, mailed Dec. 20, 2022, 15 pages.

Author Unknown, "Technical Specification Group Services and System Aspects; System Architecture for the 5G System; Stage 2 (Release 15)," Technical Specification 23.501, Version 15.4.0, 3GPP Organizational Partners, Dec. 2018, 236 pages.

Author Unknown, "Technical Specification Group Services and System Aspects; System Architecture for the 5G System; Stage 2 (Release 15)," Technical Specification 23.501, Version 15.5.0, 3GPP Organizational Partners, Mar. 2019, 241 pages.

Author Unknown, "Technical Specification Group Services and System Aspects; Procedures for the 5G System; Stage 2 (Release 15)," Technical Specification 23.502, Version 15.4.1, 3GPP Organizational Partners, Jan. 2019, 347 pages.

Author Unknown, "Technical Specification Group Services and System Aspects; Procedures for the 5G System; Stage 2 (Release 15)," Technical Specification 23.502, Version 15.5.1, 3GPP Organizational Partners, Apr. 2019, 354 pages.

Samsung, "S2-1903581: Npn subscription data provisioning," Third Generation Partnership Project (3GPP), SA WG2 Meeting #132, Apr. 8-12, 2019, 11 pages, Xi'an, China.

Samsung, "S2-1904800: Provisioning of 5G LAN group configuration parameters," Third Generation Partnership Project (3GPP), TSG-SA WG2 Meeting #132, Apr. 8-12, 2019, 4 pages, Xi'an, China.

International Search Report and Written Opinion for International Patent Application No. PCT/CN2020/089778, mailed Aug. 10, 2020, 9 pages.

Examination Report for Indian Patent Application No. 202147057500, mailed Apr. 25, 2022, 5 pages.

* cited by examiner

METHOD AND APPARATUS FOR MANAGING NETWORK SLICE FOR TERMINAL DEVICE

This application is a 35 U.S.C. § 371 national phase filing of International Application No. PCT/CN2020/089778, filed May 12, 2020, which claims the benefit of International Application No. PCT/CN2019/087050, filed May 15, 2019, the disclosures of which are incorporated herein by reference in their entireties.

TECHNICAL FIELD

The present disclosure relates generally to the technology of communication system, and in particular, to a method and an apparatus for managing network slice for terminal device.

BACKGROUND

This section introduces aspects that may facilitate better understanding of the present disclosure. Accordingly, the statements of this section are to be read in this light and are not to be understood as admissions about what is in the prior art or what is not in the prior art.

Network slicing concept is used to fulfill rich requirements from various use cases. Various network services with different characteristics will be exposed to third party applications/users/operators as capabilities to enable various new business models. A specific network service can be instantiated according to on demand requirements for third party users/operators and the business policy between the network service providers and the network service consumers.

Different policies, such as Network slicing selection Policy, NSSP may be used by a terminal device (such as a user equipment, UE) to associate the matching application with a specific network slice. As such, UE may run the application using the connection setup within the designated network slice which has pre-defined features, quality of service that can fulfill certain business model.

However, such NSSP is usually pre-configured in the UE, or provisioned to UE from core network e.g. via policy control function, PCF, and it is hard to be adjusted timely. For example, even when a server, or server function/application function, which provides service to the UE via the network, finds out the current network slice for the UE is not suitable for the current service obviously, there is no way to change the network slice for the UE timely.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Certain aspects of the present disclosure and their embodiments may provide solutions to these or other challenges. There are, proposed herein, various embodiments which address one or more of the issues disclosed herein. Namely, according to embodiments of the present disclosure, a server may be able to change the network slice for a terminal device.

A first aspect of the present disclosure provides a method performed at a server function, comprising: determining to change a network slice for a terminal device; and transmitting, to an exposure function, a request to change the network slice for the terminal device.

In embodiments of the present disclosure, the terminal device is included in a group of terminal devices; the network slice is changed for each terminal device in the group of terminal devices.

In embodiments of the present disclosure, the request includes an identifier of the terminal device, and external information of network slice.

In embodiments of the present disclosure, the identifier comprises an external identifier; the external information of network slice comprises at least one of: an external slice type of a source network slice, or an external slice type of a target network slice; the external slice type includes at least one of: eMBB slice, URLLC slice, or eMTC slice; and eMBB refers to enhanced mobile broadband, URLLC refers to ultra reliable low latency communications, and eMTC refers to enhanced machine type communication.

In embodiments of the present disclosure, the method further comprises: transmitting, to the exposure function, a request for updating a UE route selection policy, URSP, or a network slicing selection policy, NSSP for the terminal device; UE refers to user equipment.

In embodiments of the present disclosure, the exposure function comprises: a network exposure function, NEF.

In embodiments of the present disclosure, the server function comprises: an application function, AF, or a service capability server/application server, SCS/AS.

In embodiments of the present disclosure, the terminal device comprises: a user equipment, UE.

A second aspect of the present disclosure provides a method performed at an exposure function, comprising: receiving, from a server function, a first request to change a network slice for a terminal device; transmitting, to a network function, a second request to change the network slice for the terminal device.

In embodiments of the present disclosure, the terminal device is included in a group of terminal devices; the network slice is changed for each terminal device in the group of terminal devices.

In embodiments of the present disclosure, the method further comprises: determining an authorization of the first request.

In embodiments of the present disclosure, the method further comprises: mapping the first request to the second request; the first request includes an external identifier of the terminal device, and external information of network slice; the external information of network slice comprises at least one of: an external slice type of a source network slice, or an external slice type of a target network slice; the external slice type includes at least one of: eMBB slice, URLLC slice, or eMTC slice; and eMBB refers to enhanced mobile broadband, URLLC refers to ultra reliable low latency communications, and eMTC refers to enhanced machine type communication; the second request includes an internal identifier of the terminal device, and internal information of network slice; and the internal information of network slice comprises at least one of: an identifier of the source network slice, an identifier of the target network slice, or a data network name, DNN.

In embodiments of the present disclosure, the method further comprises: obtaining context information about the terminal device; the context information comprises information about at least one of: an access and mobility management function instance, AMF instance, where the terminal device is registered with; a session management function instance, SMF instance, where the terminal device is registered with; a network slice, where the terminal device is attached to; a data network name, DNN; or subscription information.

In embodiments of the present disclosure, at least part of the context information is obtained from a unified data management, UDM.

In embodiments of the present disclosure, the subscription information is obtained from the UDM; and the subscription information comprises information about at least one of: a subscribed slice, or a subscribed data network name.

In embodiments of the present disclosure, the method further comprises: obtaining session information about the terminal device; the session information comprises information about at least one of: an identifier of the terminal device; a DNN; or a policy control function instance, PCF instance, that handles a data session of the terminal device.

In embodiments of the present disclosure, the network function comprises at least one of: a unified data management, UDM; a policy control function, PCF; a network slice selection function, NSSF; an access and mobility management function, AMF; or a session management function, SMF.

In embodiments of the present disclosure, the exposure function comprises: a network exposure function.

In embodiments of the present disclosure, the second request comprises: a reason code indicating that the notification is triggered by the server function.

In embodiments of the present disclosure, the reason code is optional.

A third aspect of the present disclosure provides a method performed at a network function, comprising: receiving, from an exposure function, a second request to change a network slice for a terminal device; transmitting, to another network function, a third request to change the network slice for the terminal device.

In embodiments of the present disclosure, the network function comprises: a UDM, or a PCF, or a NSSF; and the another network function comprises: an AMF, or a SMF.

In embodiments of the present disclosure, the network function comprises: a UDM, and the another network function comprises: an AMF; the third request comprises an indication for the terminal device to perform a registration procedure.

In embodiments of the present disclosure, the third request comprises internal information of network slice; and the internal information of network slice comprises at least one of: an identifier of a source network slice, an identifier of a target network slice, or a data network name, DNN.

In embodiments of the present disclosure, the network function comprises: a UDM, and the another network function comprises: a SMF; the third request comprises an indication for the terminal device to release a session.

In embodiments of the present disclosure, the network function comprises: a PCF, and the another network function comprises: a SMF; the third request comprises an indication for the terminal device to release a session.

In embodiments of the present disclosure, the network function comprises: a NSSF, and the another network function comprises: an AMF; the third request comprises an indication for the terminal device to perform a registration procedure.

In embodiments of the present disclosure, the second request comprises: a reason code indicating that the notification is triggered by the server function.

In embodiments of the present disclosure, the third request comprises: the reason code; or the third request comprises another reason code, which is mapped from the reason code by the network function.

In embodiments of the present disclosure, the reason code is optional.

A fourth aspect of the present disclosure provides a method performed at a network function, comprising: receiving, from another network function, a third request to change a network slice for a terminal device; transmitting, to the terminal device, a notification to change the network slice for the terminal device.

In embodiments of the present disclosure, the method further comprises: transmitting, to the terminal device, slices information about allowed network slices, configured network slices, or target network slices.

In embodiments of the present disclosure, the network function comprises: an AMF; and the notification comprises an indication for the terminal device to perform a registration procedure.

In embodiments of the present disclosure, the network function comprises: a SMF; and the notification comprises an indication for the terminal device to release a session.

In embodiments of the present disclosure, the third request comprises: a reason code indicating that the notification is triggered by the server function; and the notification comprises: the reason code.

In embodiments of the present disclosure, the reason code is optional.

A fifth aspect of the present disclosure provides a method performed at a terminal device, comprising: receiving a notification to change a network slice for the terminal device; changing the network slice for the terminal device.

In embodiments of the present disclosure, the notification comprises a reason code indicating that the notification is triggered by a server function.

In embodiments of the present disclosure, the reason code is optional.

In embodiments of the present disclosure, the notification comprises an indication for the terminal device to perform a registration procedure; or the notification comprises an indication for the terminal device to release a session; or the notification comprises an indication for the terminal device to reestablish a session.

In embodiments of the present disclosure, a target network slice for performing the registration procedure, or for reestablishing the session is determined based on a local configuration, a URSP or NSSP, or the notification.

In embodiments of the present disclosure, the terminal device comprises a user equipment, UE.

A sixth aspect of the present disclosure provides an apparatus for a server function, comprising: a processor; and a memory, containing instructions executable by the processor; the apparatus for the server function is operative to implement the method according to any of embodiments of the first aspect.

A seventh aspect of the present disclosure provides an apparatus for an exposure function, comprising: a processor; and a memory, containing instructions executable by the processor; the apparatus for the exposure function is operative to implement the method according to any of embodiments of the second aspect.

An eighth aspect of the present disclosure provides an apparatus for a network function, comprising: a processor; and a memory, containing instructions executable by the processor; the apparatus for the network function is operative to implement the method according to any of embodiments of the third aspect and the fourth aspect.

A ninth aspect of the present disclosure provides an apparatus for a terminal device, comprising: a processor; and a memory, containing instructions executable by the processor; the apparatus for the terminal device is operative to implement the method according to any of embodiments of the fifth aspect.

A tenth aspect of the present disclosure provides a computer readable storage medium having a computer program stored thereon, the computer program executable by an apparatus to cause the apparatus to carry out the method according to any of embodiments of the first aspect to the fifth aspect.

According to embodiments of the present disclosure, when the server function finds out the current network slice situation is not suitable for the service being provided/to be provided to the terminal device, the network slice for the terminal device may be changed/updated timely.

BRIEF DESCRIPTION OF DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
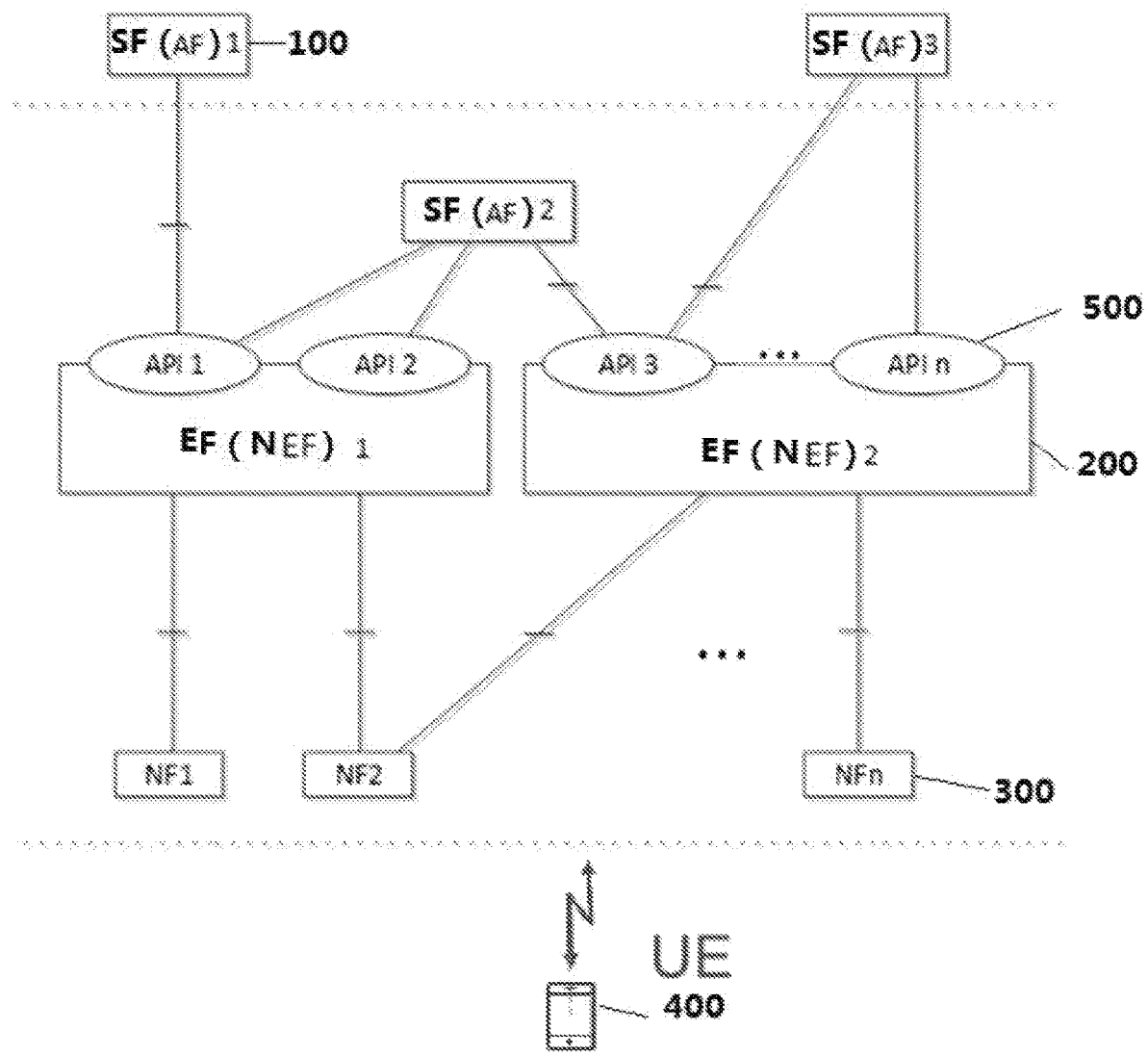
FIG. 1 is an exemplary diagram showing a simplified structure of a communication network.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network", or "communication network/system" refers to a network/system following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "function", "node", "network node" or "network side node" refers to a network device/apparatus/entity with accessing capability in a communication network via which a terminal device accesses to the network and receives services therefrom. The node/function may include a base station (BS), an access point (AP), a multi-cell/multicast coordination entity (MCE), a server node/function (such as a service capability server/application server, SCS/AS, group communication service application server, GCS AS, application function, AF), an exposure node (such as a service capability exposure function, SCEF, network exposure function, NEF), a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term "terminal device" encompasses a device which is able to communicate with a network node/network function, such as a base station, or with another wireless device by transmitting and/or receiving wireless signals. Thus, the term terminal device encompasses, but is not limited to: a mobile phone, a stationary or mobile wireless device for machine-to-machine communication, an integrated or embedded wireless card, an externally plugged in wireless card, a vehicle, etc.

As yet another specific example, in an Internet of things (IoT) scenario, a terminal device may also be called an IoT device and represent a machine or other device that performs monitoring, sensing and/or measurements etc., and transmits the results of such monitoring, sensing and/or measurements etc. to another terminal device and/or a network equipment. The terminal device may in this case be a machine-to-machine (M2M) device, which may in a 3rd generation partnership project (3GPP) context be referred to as a machine-type communication (MTC) device.

As one particular example, the terminal device may be a UE implementing the 3GPP narrow band Internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

FIG. 1 is an exemplary diagram showing a simplified structure of a communication network.

As shown in FIG. 1, a network includes a plurality of network functions, NF 300 (NF 1, NF 2 . . . NF n, n is an integer). The network provides network exposure capability to enable suitable access/exchange of network information to a server function or terminal device. The server function, SF, such as application function, AF 100 (AF 1, AF 2, AF 3), uses application program interfaces, API 500 (API 1, API 2, API 3 . . . API n, n is an integer) of the exposure functions, EF, such as network exposure function, NEF 200 (NEF 1, NEF 2), so as to access/exchange network information.

Namely, the Network Exposure Function (NEF) may support exposure of capabilities of network functions, using the information collected via network internal interfaces, and exposing them towards Application Function (AF) via proper APIs.

The terminal device, such as the user equipment, UE, 400 may receive service form the AF 100. However, if the current network slice for the UE 400 is not suitable for the current service provided by the AF 100, the quality of service might be affected, or the service might have to be stopped.

It is expected that there would be many different types of network slices for different usages. The relation between specific usage and the network service with special characteristics may be dynamic and flexible to support flexible/agile business model. For example, during initial period of special usage, it is possible that special usage traffic is still served by a common network slice for basic network service. With the increased numbers of special users or VIP users, a dedicated network slice is instantiated to support required features and enable the flexible business model. In addition, as mentioned by 3GPP, usually one default network slice is associated with one or more dedicated network slices. In case the dedicated network slice for the usage is not available or without sufficient information, the special usage UE can be directed to default network slice for basic network service or steered to a dedicated network slice, using serving operator specific policies.

The $5^{th}$ generation core network, 5GC, provides policy information for the UE, such as UE Route Selection Policy (URSP). This policy is used by the UE to determine whether a detected application can be associated to an established packet data unit, PDU, Session, can be offloaded to non-3GPP access outside a PDU Session, or can trigger the establishment of a new PDU Session.

Part of URSP is Network slicing selection Policy (NSSP). This is used by the UE to associate the matching application with a specific network slice. The NSSP rules associate an application with one or more Single Network Slice Selection Assistance information, S-NSSAIs, in Configured NSSAI for the Home Public Land Mobile Network, HPLMN, of the UE. A default rule which matches all applications to an S-NSSAI in Configured NSSAI for the HPLMN may also be included. As such, UE can run the application using the connection setup within the designated network slice which has pre-defined features, quality of service that can fulfill certain business model.

URSP/NSSP may be pre-configured in the UE or may be provisioned to UE from 5GC, e.g. via PCF. When the Subscription Information changes and the network wants to control/modify the UE usage of those network slices, then the network provisions/updates the UE with NSSP as part of the URSP rules.

The establishment of User Plane connectivity to a Data Network via a network slice comprises two steps:
  performing a RM (registration management) procedure to select an AMF that supports the required Network Slices.
  establishing one or more PDU Session to the required Data network via the Network Slice Instance(s).

When a UE registers with a Public Land Mobile Network, PLMN, it provides to the network a Requested NSSAI containing the S-NSSAI(s) corresponding to the slice(s) to which the UE wishes to register. UE associates Applications to S-NSSAIs based on NSSP of the URSP rules.

The selection of the set of Network Slice instances for the UE is triggered by the first contacted AMF in a registration procedure normally by interacting with the NSSF. 3GPP defined network slice selection flow, such as in 3GPP technical specification, TS, 23.502 V15.5.1, is shown below.

If there is a need for slice selection, e.g. the initial AMF cannot serve all the S-NSSAI(s) from the Requested NSSAI permitted by the subscription information, the initial AMF sends a Slice Selection Request to the NSSF. It sends to NSSF Requested NSSAI, Subscribed S-NSSAIs, PLMN ID of the Subscription Permanent Identifier, SUPI, and the Tracking Area Identity, TAI, of the UE.

The NSSF returns to initial AMF the Allowed NSSAI and the target AMF Set or, based on configuration, the list of candidate AMF(s). When multiple Network Slice instances in the registration area are able to serve a given S-NSSAI and the NSSF has selected one of them to serve the UE, the NSSF may return a Network Slice Instance, NSI, ID associated with that given S-NSSAI. The NSSF may return the Network Repository Function, NRF(s), to be used to select NFs/services within the selected Network Slice instance(s). Further, it may also return information regarding rejection causes for S-NSSAI(s) not included in the Allowed NSSAI.

As per 3GPP definition, NSSF makes the slice selection decision, based on this information, local configuration, and other locally available information including radio access network, RAN, capabilities in the current Tracking Area for the UE.

Moreover, NSSF may also take the additional input, like information from analytic platform, operational status of slice and NF, Service Level Agreement, SLA, management information, operation and maintenance, O&M, and orchestration information etc., as for slice selection. I.e. NSSF may make use of lots of dynamic information available at decision point to make an optimized slice selection result.

The set of Network Slices for a UE can be changed at any time while the UE is registered with a network, and may be initiated by the network, or by the UE.

The network, based on local policies, subscription changes and/or UE mobility, operational reasons (e.g. a Network Slice instance is no longer available or load level information for a network slice instance is provided by the Network Data Analytics Function, NWDAF), may change the set of Network Slice(s) to which the UE is registered and provide the UE with a new Allowed NSSAI or Configured NSSAI. The network may perform such a change during a Registration procedure or trigger a notification towards the UE of the change of the Network Slices using a UE Configuration Update procedure as specified in 3GPP TS 23.502 V15.5.1, clause 4.2.4.

When the UE's subscription Information contains more than one S-NSSAI and the network wants to control/modify the UE usage of those S-NSSAIs, then the network may also provisions/updates the UE with NSSP as part of the URSP rules.

From UE side, when URSP rules are updated or their validity changes, the association of existing applications to PDU Sessions may need to be re-evaluated. The UE may also re-evaluate the application to PDU Session association due to the following reasons: periodic re-evaluation based on UE implementation; an existing PDU Session that is used for routing traffic of an application based on a URSP rule is released.

If the re-evaluation leads to a change of the application to PDU Session association, e.g. the application is to be associated with another PDU session or a new PDU session needs to be established, the UE may enforce such changes in a timely manner based on implementation.

However, in the situation that the external AF triggers URSP change and intends for network slice change for UE, it is still up to UE to decide when and how to enforce such changes. The slice change for UE(s) may take longer timer than expected. This can then lead to unwanted or inefficient network resource usage.

Embodiments to further improve the managing of a network slice for a terminal device will be further illustrated below.

Figure 2:
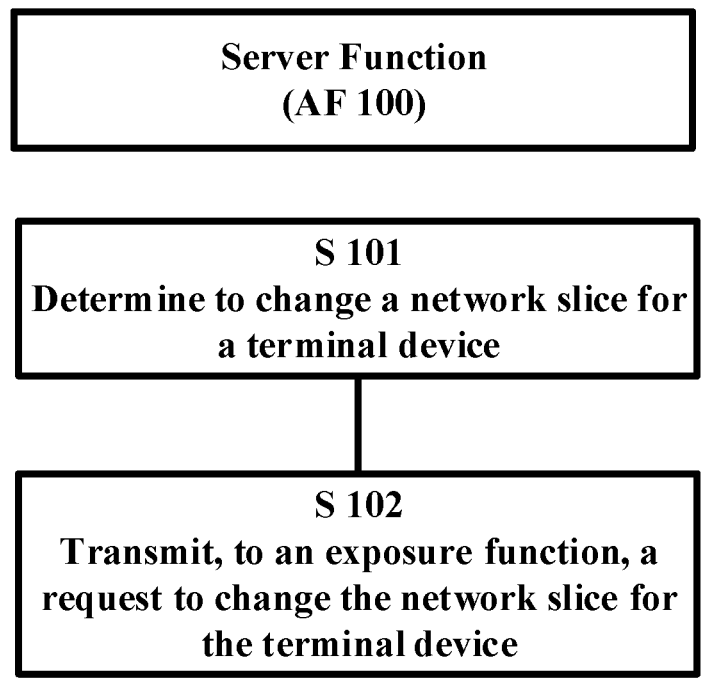
FIG. 2 is an exemplary flow chart showing a method performed at a server function for managing a network slice for a terminal device, according to embodiments of the present disclosure.

FIG. 2 is an exemplary flow chart showing a method performed at a server function for managing a network slice for a terminal device, according to embodiments of the present disclosure.

As shown in FIG. 2, the method performed at a server function, such as the AF 100 comprises: S101, determining to change a network slice for a terminal device; and S102, transmitting, to an exposure function, a request to change the network slice for the terminal device.

The AF 100 may determine to change the network slice, when the current network slice for the terminal device, such as the UE 400, is not suitable to the service to be provided to the UE 400. It should be understood that the change of the network slice may include the change for a source network slice to a target network slice, or from no network slice to a target network slice.

According to embodiments of the present disclosure, a method is performed at the server function to change the network slice for the terminal device. Therefore, whenever the server function finds out the current network slice situation is not suitable for the service being provided/to be provided to the terminal device, the network slice for the terminal device may be changed/updated timely. By utilizing such managing method, it makes an effective usage of network slice resources.

In embodiments of the present disclosure, the terminal device is included in a group of terminal devices; the network slice is changed for each terminal device in the group of terminal devices.

In embodiments of the present disclosure, the request includes an identifier of the terminal device, and external information of network slice.

For example, the request to change the network slice for the terminal device may include an identifier of the UE 400. Further, additionally or alternatively, the request to change the network slice for the terminal device may include a group identifier of a group of UE including the UE 400. The external information of network slice may indicate a target network slice the UE 400 should change to.

In embodiments of the present disclosure, the identifier comprises an external identifier; the external information of network slice comprises at least one of: an external slice type of a source network slice, or an external slice type of a target network slice; the external slice type includes at least one of: eMBB slice, URLLC slice, or eMTC slice; and eMBB refers to enhanced mobile broadband, URLLC refers to ultra reliable low latency communications, and eMTC refers to enhanced machine type communication.

For example, the external information of network slice may indicate that the AF 100 wants the UE 400 to change from a source network slice with type of eMBB to URLLC, so as to support a service requiring low latency. It should be understood that the type of slice may be directly defined with the application purpose. For example, the external slice type of a target network slice may be "V2X", when a V2X application needs to be served. Further, the external information of network slice may include slice instance level information, such as a specific network slice instance identifier. For example, AF 100 can request a slice change from a source network slice with an external identifier of "eMBB-1" to a target network slice with an external identifier of "eMTC-1". Then, the source network slice with an external identifier of "eMBB-1" may be mapped to an internal slice instance with an internal identifier of "NSSAI-1" by the NEF 200.

Figure 3:
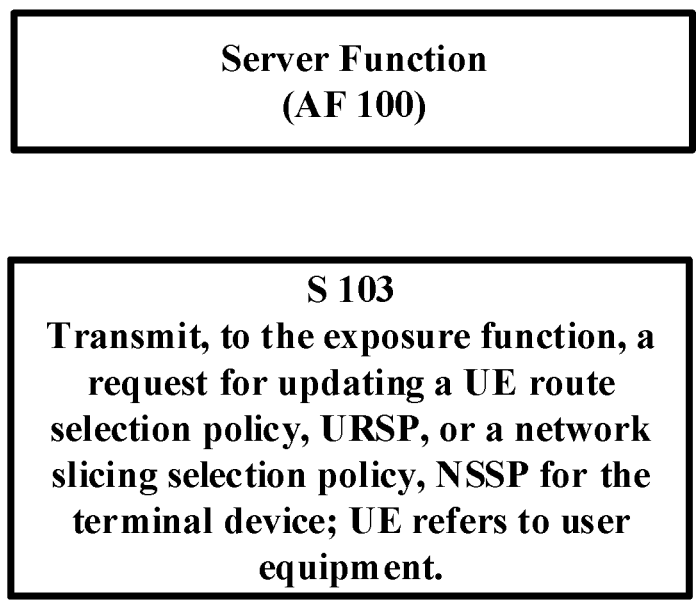
FIG. 3 is an exemplary flow chart showing an additional step of the method shown in FIG. 2, according to embodiments of the present disclosure.

FIG. 3 is an exemplary flow chart showing an additional step of the method shown in FIG. 2, according to embodiments of the present disclosure.

As shown in FIG. 3, the method further comprises: S103, transmitting, to the exposure function, a request for updating a UE route selection policy, URSP, or a network slicing selection policy, NSSP for the terminal device; UE refers to user equipment.

For example, with the updated URSP/NSSP, the intention of AF 100 to change the network slice of the UE 400 can be preserved in the UE 400. Namely, the network slice of URLLC/V2X may be configured as a default network slice type, whenever the UE 400 try to register in the network.

In embodiments of the present disclosure, the exposure function comprises: a network exposure function, NEF, such as NEF 200 in FIG. 1.

In embodiments of the present disclosure, the server function comprises: an application function, AF, such as AF 100 shown in FIG. 1, or a service capability server/application server, SCS/AS, not shown in FIG. 1.

In embodiments of the present disclosure, the terminal device comprises: a user equipment, UE, such as UE 400 shown in FIG. 1.

Figure 4:
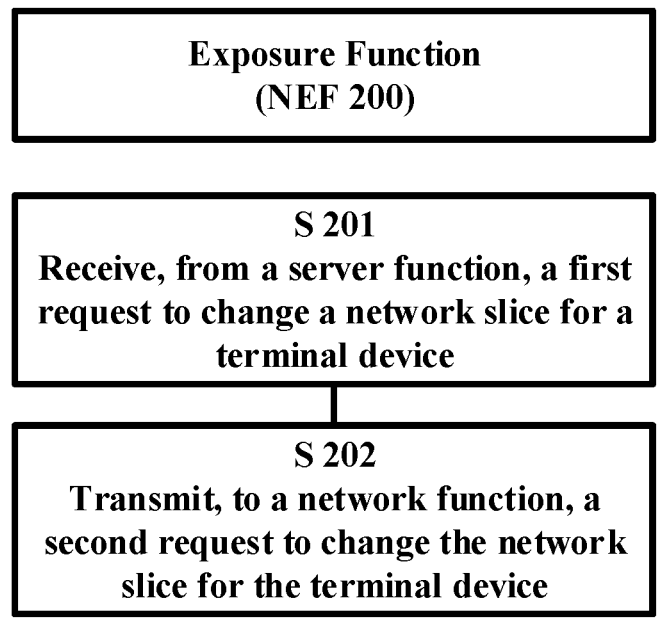
FIG. 4 is an exemplary flow chart showing a method performed at an exposure function for managing a network slice for a terminal device, according to embodiments of the present disclosure.

FIG. 4 is an exemplary flow chart showing a method performed at an exposure function for managing a network slice for a terminal device, according to embodiments of the present disclosure.

As shown in FIG. 4, the method performed at the exposure function comprises: S201, receiving, from a server function, a first request to change a network slice for a terminal device; S202, transmitting, to a network function, a second request to change the network slice for the terminal device.

According to the embodiments of the present disclosure, the utilization of the exposure function may improve the efficiency and the safety. For example, the exposure function may provide an interface, such as API 500 shown in FIG. 1, for the server function to utilize.

In embodiments of the present disclosure, the terminal device is included in a group of terminal devices; the network slice is changed for each terminal device in the group of terminal devices.

Figure 5:
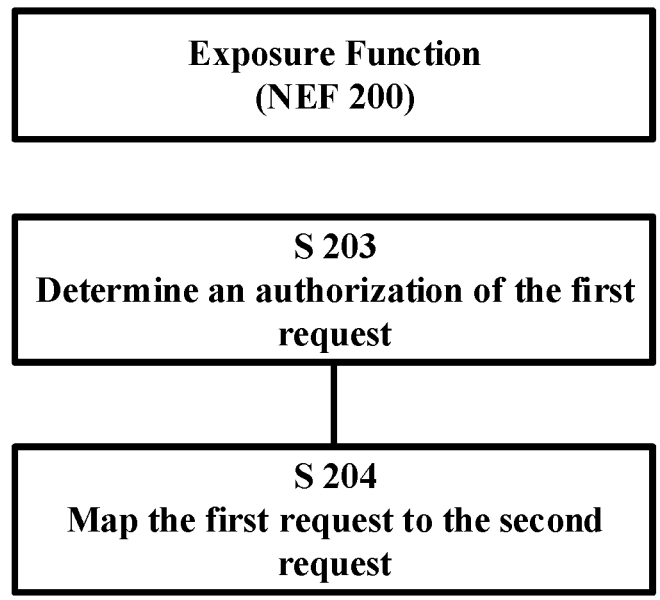
FIG. 5 is an exemplary flow chart showing additional steps of the method shown in FIG. 4, according to embodiments of the present disclosure.

FIG. 5 is an exemplary flow chart showing additional steps of the method shown in FIG. 4, according to embodiments of the present disclosure.

In embodiments of the present disclosure, the method further comprises: S203, determining an authorization of the first request. For example, if the exposure function determines that the AF 100 is not authorized to manage the slice for the UE 400, the request from the AF 100 to change the network slice for the UE 400 may be rejected. The safety of the network communication may be improved.

In embodiments of the present disclosure, the method further comprises: S204, mapping the first request to the second request; the first request includes an external identifier of the terminal device, and external information of network slice; the external information of network slice comprises at least one of: an external slice type of a source network slice, or an external slice type of a target network slice; the external slice type includes at least one of: eMBB slice, URLLC slice, or eMTC slice; and eMBB refers to enhanced mobile broadband, URLLC refers to ultra reliable low latency communications, and eMTC refers to enhanced machine type communication; the second request includes an internal identifier of the terminal device, and internal information of network slice; and the internal information of network slice comprises at least one of: an identifier of the source network slice, an identifier of the target network slice, or a data network name, DNN.

The mapping between above external parameters/information and above internal external parameters/information simplifies the access from AF, UE to the network and provides protection for the network. For example, the AF, and UE only needs to provide a slice type, such as V2X, without knowing a specific identifier of the network slice.

Figure 6:
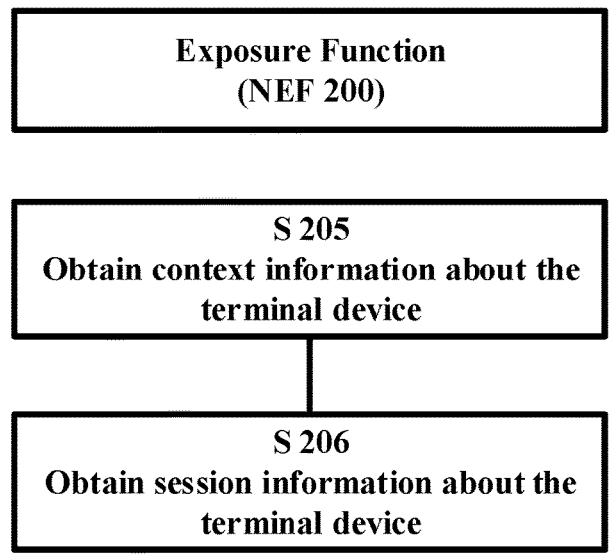
FIG. 6 is an exemplary flow chart showing additional steps of the method shown in FIG. 4, according to embodiments of the present disclosure.

FIG. 6 is an exemplary flow chart showing additional steps of the method shown in FIG. 4, according to embodiments of the present disclosure.

As shown in FIG. 6, the method further comprises: S205, obtaining context information about the terminal device; the context information comprises information about at least one of: an access and mobility management function instance, AMF instance, where the terminal device is registered with; a session management function instance, SMF instance, where the terminal device is registered with; a network slice, where the terminal device is attached to; a data network name, DNN; or subscription information.

In embodiments of the present disclosure, at least part of the context information is obtained from a unified data management, UDM.

In embodiments of the present disclosure, the subscription information is obtained from the UDM; and the subscription information comprises information about at least one of: a subscribed slice, or a subscribed data network name.

In embodiments of the present disclosure, the method further comprises: S206, obtaining session information about the terminal device; the session information comprises information about at least one of: an identifier of the terminal device; a DNN; or a policy control function instance, PCF instance, that handles a data session of the terminal device.

In embodiments of the present disclosure, the network function comprises at least one of: a unified data management, UDM; a policy control function, PCF; a network slice selection function, NSSF; an access and mobility management function, AMF; or a session management function, SMF.

According to embodiments of the present disclosure, the exposure function may trigger any of the network functions/nodes, which is able to change the network slice for the terminal device.

In embodiments of the present disclosure, the exposure function comprises: a network exposure function, such as NEF 200 shown in FIG. 1.

In embodiments of the present disclosure, the second request comprises: a reason code indicating that the notification is triggered by the server function.

In embodiments of the present disclosure, the reason code is optional.

Figure 7:
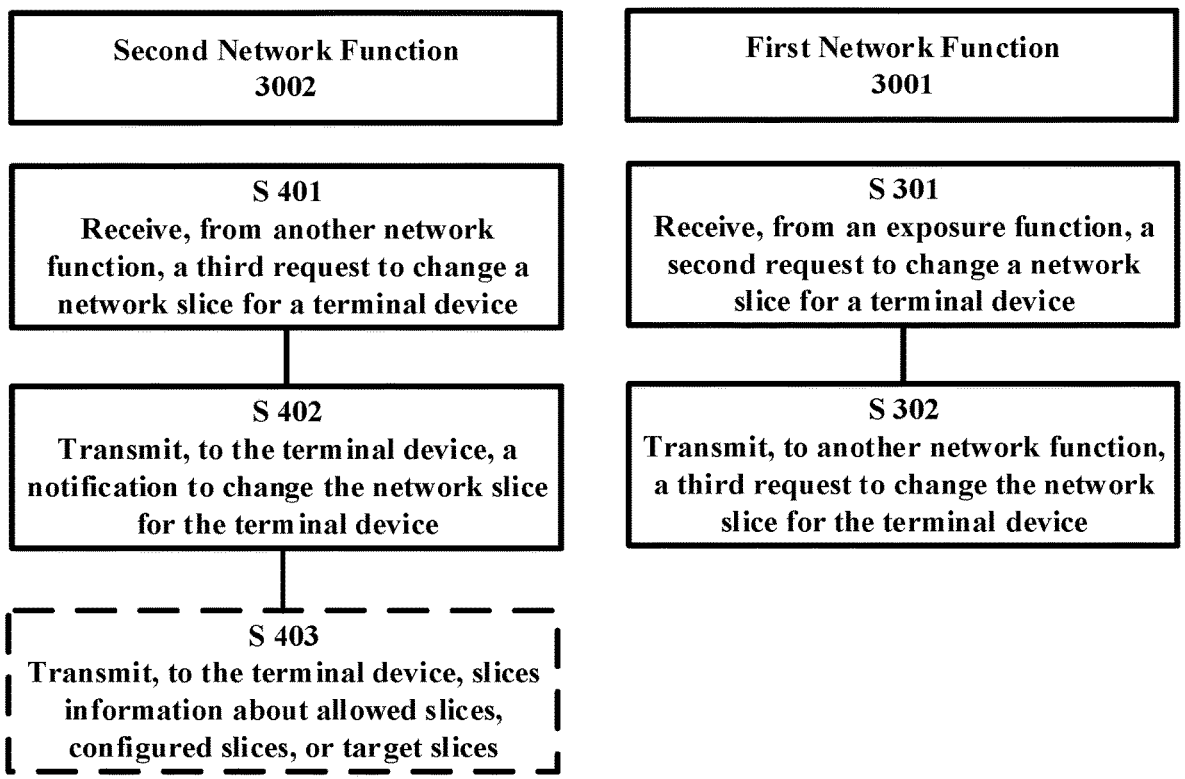
FIG. 7 is an exemplary flow chart showing methods performed at network functions for managing a network slice for a terminal device, according to embodiments of the present disclosure.

FIG. 7 is an exemplary flow chart showing methods performed at network functions for managing a network slice for a terminal device, according to embodiments of the present disclosure.

As shown in FIG. 7, a method performed at a network function, such as a first network function 3001, comprises: S301, receiving, from an exposure function, a second request to change a network slice for a terminal device; S302, transmitting, to another network function, such as a second network function 3002, a third request to change the network slice for the terminal device.

According to embodiments of the present disclosure, the first network function 3001 may be a network function which does not manage the UE directly. The first network 3001 triggers the change of the network slice for the terminal device via the second network function 3002. The second network function 3002 may be a network function which manages the UE directly.

In embodiments of the present disclosure, the first network function 3001 comprises: a UDM, or a PCF, or a NSSF; and the second network function 3002 comprises: an AMF, or a SMF.

In embodiments of the present disclosure, the first network function 3001 comprises: a UDM, and the second network function 3002 comprises: an AMF; the third request comprises an indication for the terminal device to perform a registration procedure.

In embodiments of the present disclosure, the third request comprises internal information of network slice; and the internal information of network slice comprises at least one of: an identifier of a source network slice, an identifier of a target network slice, or a data network name, DNN.

According to embodiments of the present disclosure, the procedure to change the network slice for the terminal device may relates to AF 100, NEF 200, UDM, AMF, UE sequentially. The change of the network slice may be achieved by registration procedure of the terminal device. Namely, a target network slice is to be utilized by the terminal device during registration.

In embodiments of the present disclosure, the first network function 3001 comprises: a UDM, and the second network function 3002 comprises: a SMF; the third request comprises an indication for the terminal device to release a session.

According to embodiments of the present disclosure, the procedure to change the network slice for the terminal device may relates to AF 100, NEF 200, UDM, SMF, UE sequentially. The change of the network slice may be achieved by a session creation procedure of the terminal device after a current session is released. Namely, a target network slice is to be utilized by the terminal device during session creation procedure.

In embodiments of the present disclosure, the first network function 3001 comprises: a PCF, and the second network function 3002 comprises: a SMF; the third request comprises an indication for the terminal device to release a session.

In embodiments of the present disclosure, the first network function 3001 comprises: a NSSF, and the second network function 3002 comprises: an AMF; the third request comprises an indication for the terminal device to perform a registration procedure.

According to embodiments of the present disclosure, the procedure to change the network slice for the terminal device may relates to AF 100, NEF 200, PCF, SMF, UE sequentially, or AF 100, NEF 200, NSSF, AMF, UE sequentially.

In embodiments of the present disclosure, the second request comprises: a reason code indicating that the notification is triggered by the server function.

In embodiments of the present disclosure, the third request comprises: the reason code; or the third request comprises another reason code, which is mapped from the reason code by the first network function 3001.

In embodiments of the present disclosure, the reason code is optional.

Further, a method performed at a network function, such as the second network function 3002 is illustrated. The method performed at the second network function 3002 comprises: S401, receiving, from another network function, such as the first network function 3001, a third request to change a network slice for a terminal device; S402, transmitting, to the terminal device, a notification to change the network slice for the terminal device.

In embodiments of the present disclosure, the method further comprises: S403, transmitting, to the terminal device, slices information about allowed network slices, configured network slices, or target network slices.

In embodiments of the present disclosure, the second network function 3002 comprises: an AMF; and the notification comprises an indication for the terminal device to perform a registration procedure.

In embodiments of the present disclosure, the second network function 3002 comprises: a SMF; and the notification comprises an indication for the terminal device to release a session.

In embodiments of the present disclosure, the third request comprises: a reason code indicating that the notification is triggered by the server function; and the notification comprises: the reason code.

In embodiments of the present disclosure, the reason code is optional.

Figure 8:
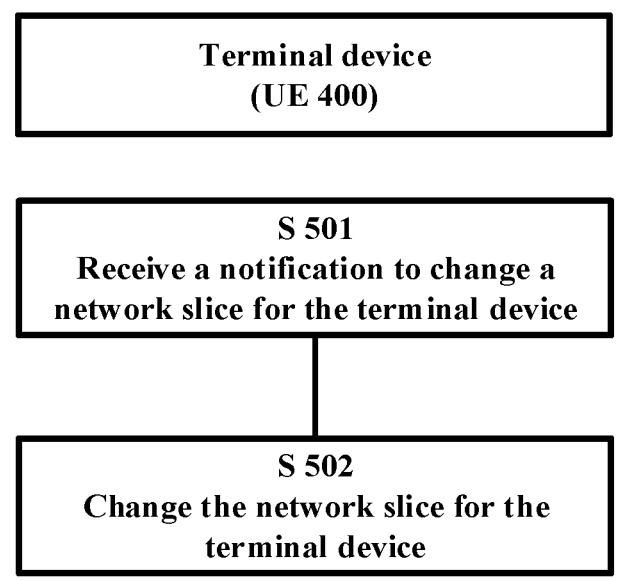
FIG. 8 is an exemplary flow chart showing a method performed at a terminal device for managing a network slice for a terminal device, according to embodiments of the present disclosure.

FIG. 8 is an exemplary flow chart showing a method performed at a terminal device for managing a network slice for a terminal device, according to embodiments of the present disclosure.

As shown in FIG. 8, a method performed at a terminal device, such as the UE 400 shown in FIG. 1, comprises: S501, receiving a notification to change a network slice for the terminal device; S502, changing the network slice for the terminal device.

In embodiments of the present disclosure, the notification comprises a reason code indicating that the notification is triggered by a server function.

In embodiments of the present disclosure, the reason code is optional.

In embodiments of the present disclosure, the notification comprises an indication for the terminal device to perform a registration procedure; or the notification comprises an indication for the terminal device to release a session; or the notification comprises an indication for the terminal device to reestablish a session.

In embodiments of the present disclosure, a target network slice for performing the registration procedure, or for reestablishing the session is determined based on a local configuration, a URSP or NSSP, or the notification.

In embodiments of the present disclosure, the terminal device comprises a user equipment, UE.

Figure 9:
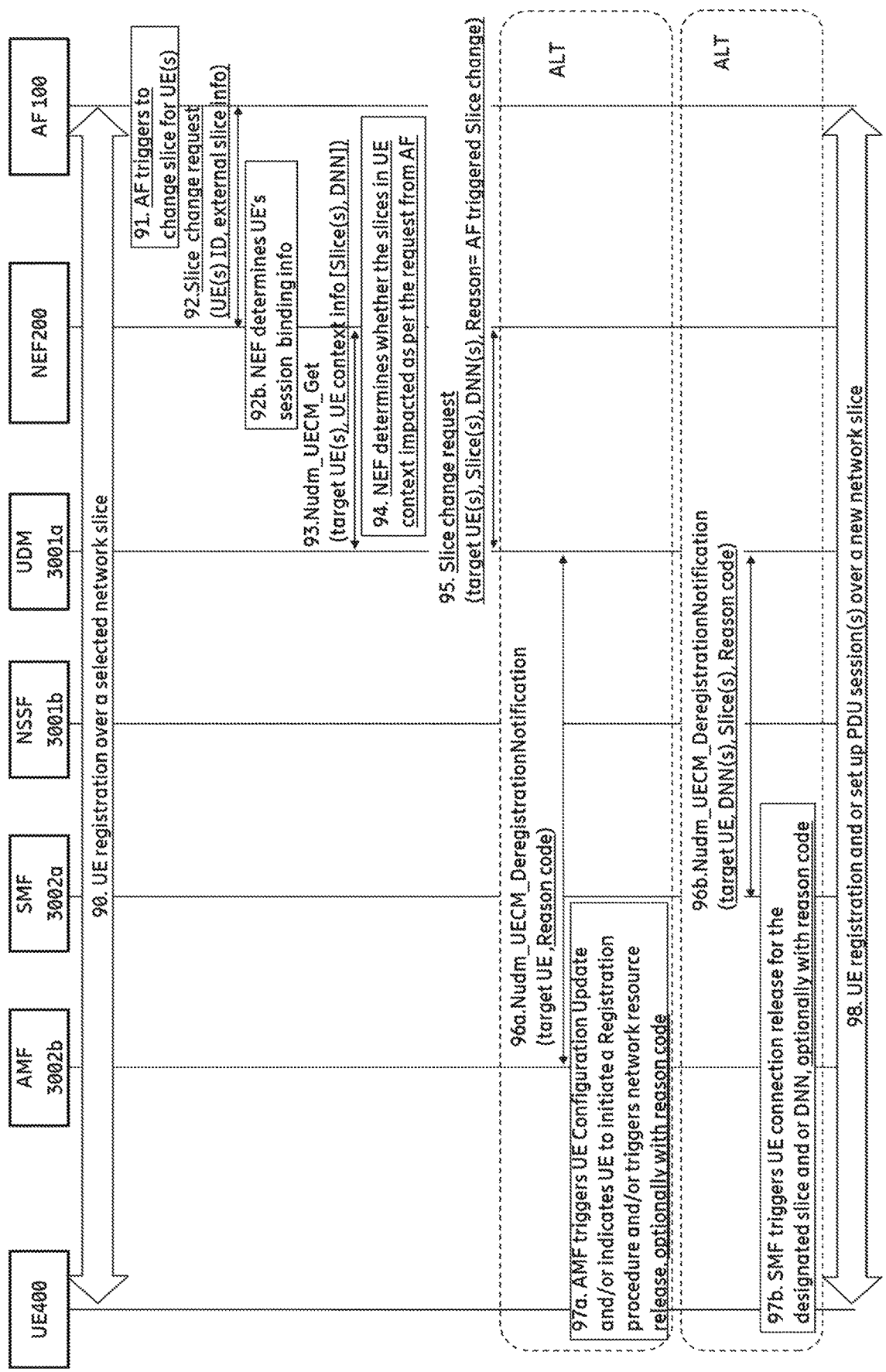
FIG. 9 is a first exemplary diagram showing more details about functions and procedures in the communication system for managing the network slice for the terminal device.

FIG. 9 is a first exemplary diagram showing more details about functions and procedures in the communication system for managing the network slice for the terminal device.

As shown in FIG. 9, the procedure to change the network slice for the terminal device relating to AF 100, NEF 200, UDM 3001*a*, AMF 3002*b*/SMF 3002*a*, UE 400 sequentially is illustrated. The procedure may be also named as a UDM anchored solution. The underlines in the figure are used for emphasizing.

Step 90 refers to a UE registration over a selected network slice.

In steps 91-92, the AF 100 determines that there is a need to change the slice(s) for the target UE(s) specified by an identifier, e.g. UE ID or UE group ID, and triggers a request to NEF 200 to change the slice for those UE(s).

AF 100 may provide additional information (named as external slice information), e.g. the source slice(s), the target slice(s), slice tenant information, action indicator (immediate, delayed), NSSP.

As to the NSSP, AF 100 may trigger network to update URSP/NSSP to UE(s) in a separate procedure or together with this procedure.

For example, AF 100 with an ID of "AFid-1" orders a slice change for one of its enterprise user UE 400.

The request may include: UE id: "GPSI=1", UE addr: "Ipaddr=10.0.0.1", Source Slice: "eMBB", Target Slice: v2x", Slice tenant: Application-1, Action indicator: "Immediate", URSP: "NSSP-1; NSSP-2".

In step 92*b*, NEF 200 determines UE's session binding information.

In step 93, NEF 200 checks the request and authorize that the AF 100 can trigger such request as well as the request conditions, e.g. the AF 100 can changes UE(s) attaching on a specific network slice, based on operator policy and/or subscription information from UDM 3001*a*.

NEF 200 may map the external slice information provided by AF 100 to the internal slice information such as Network Slice Selection Assistance Information, NSSAI, Slice/Service type, SST, Slice Differentiator, SD, Network Slice Instance ID, NSI ID etc.

NEF 200 may also fetch the UE context information such as AMF, SMF instances where UE 400 is registered with and also the network slice(s) where UE 400 is attached to, DNN(s) that UE is connected with, and/or subscription from UDM 3001*a*, such as subscribed slices, subscribed DNN(s) etc.

NEF 200 may additionally trigger session binding discovery procedure via Nbsf interface as defined in 3$^{rd}$ generation partnership project technical specification, 3GPP TS, 23.501 V15.5.0 &23.502 V15.5.1; to get UE session information, including, UE id information (e.g Subscription Permanent Identifier, SUPI, Generic Public Subscription Identifier, GPSI), DNN, and also the PCF instance that handles the UE 400's data session.

E.g. NEF 200 authorize "AFid-1" with slice tenant "Application-1" can change slice for UE 400 from Slice"eMBB" to slice "v2x"; NEF maps "eMBB" and "V2x" to "S-NSSAI=1"&"S-NSSAI=2" accordingly; NEF fetch UE 400's context information and subscription information from UDM, and discover the active slice which UE is attached to i.e. "S-NSSAI=1" and the NFs instances, i.e. AMF-1, SMF-1 where UE 400 is registered with.

In steps 94-95, NEF 200 determines that slice "S-NSSAI=1" which UE 400 is attached to is the source slice indicated by the AF 100 to change. S-NSSAI refers to Single-Network Slice Selection Assistance Information. NEF 200 then triggers slice change towards 5$^{th}$ generation core network function, 5GC NF(s), e.g. 5GC NF can be any of UDM 3001*a*, AMF 3002*b*, SMF 3002*a*, NSSF 3001*b*, PCF; NEF 200 may trigger such request directly towards these 5GC NF(s), or indirectly via intermediate 5GC NF(s)

E.g. NEF 200 sends slice change request to UDM 3001*a*, including: UE ID: GPSI=1; Source Slice: "S-NSSAI=1", Target Slice: "S-NSSAI=2", DNN="internet", Action indicator: "Immediate", Reason: "AF triggered slice change".

In step 96*a*, after receiving the request from NEF 200, UDM 3001*a* determines, based on the operator's policy, AMF 3002*b* with ID of "AMF-1" shall be notified about slice change for UE 400; UDM 3001*a* may also adjust the subscription information for UE 400 accordingly.

For example, UDM 3001*a* maps UE 400's ID "GPSI=1" to 5GC internal ID "SUPI=1", and send slice change request, e.g., "Nudm_UECM_DeregistrationNotification" to AMF 3002*b*, including: UEID: SUPI=1; Source Slice: "S-NSSAI=1"; Target Slice: "S-NSSAI=2"; DNN="internet"; Action indicator: "Immediate"; Reason: "network triggered slice change" or "AF triggered slice change".

In step 97*a*, after receiving the request from the UDM 3001*a*, AMF 3002*b* determines based on the operator's policy, UE 400 with ID of "UE-1" shall be notified about slice change. AMF 3002*b* may determine that the previous slice related information sent to UE 400 need be updated, e.g. allowed NSSAI(s), configured NSSAI(s), target NSSAI(s); AMF 3002*b* triggers UE 400 configuration update procedure.

For example, AMF 3002*b* may indicate UE 400 to perform an immediate registration; AMF 3002*b* may trigger network resource release procedure accordingly; AMF 3002*b* may indicate UE 400 with the reason for slice change, which is "network triggered slice change" or "AF triggered slice change".

In step 96*b*, alternatively for step 96*a*, after receiving the request from the NEF 200, UDM 3001*a* determines, based on the operator's policy, only specific data connection shall be released, e.g. SMF 3002*a* with ID of "SMF-1" shall be notified about slice change for UE 400.

For example, UDM 3001*a* maps UE ID "GPSI=1" to 5GC internal ID "SUPI=1", and send slice change request, e.g. "Nudm_UECM_DeregistrationNotification" to SMF 3002*a*, including: UE ID: SUPI=1; Source Slice: "S-NSSAI=1"; Target Slice: "S-NSSAI=2"; DNN: "internet"; Action indicator: "Immediate"; Reason: "network triggered slice change" or "AF triggered slice change".

In step 97*b*, after receiving the request from UDM 3001*a*, SMF 3002*a* determines based on the operator policy, the PDU session(s) shall be released; SMF 3002*a* triggers PDU session release procedure accordingly; SMF 3002*a* may indicate UE 400 the reason, which is "network triggered slice change" or "AF triggered slice change".

In step 98, the UE 400 then re-evaluates the application to PDU Session association with the current slice, trigger attach to network (as per 97*a*) and or establish new PDU session (s) (as per 97*b*), with new requested NSSAI based on the latest received slice related information (e.g. allowed NSSAIs, Configured NSSAI, target NSSAI etc.) and/or URSP/NSSP.

Figure 10:
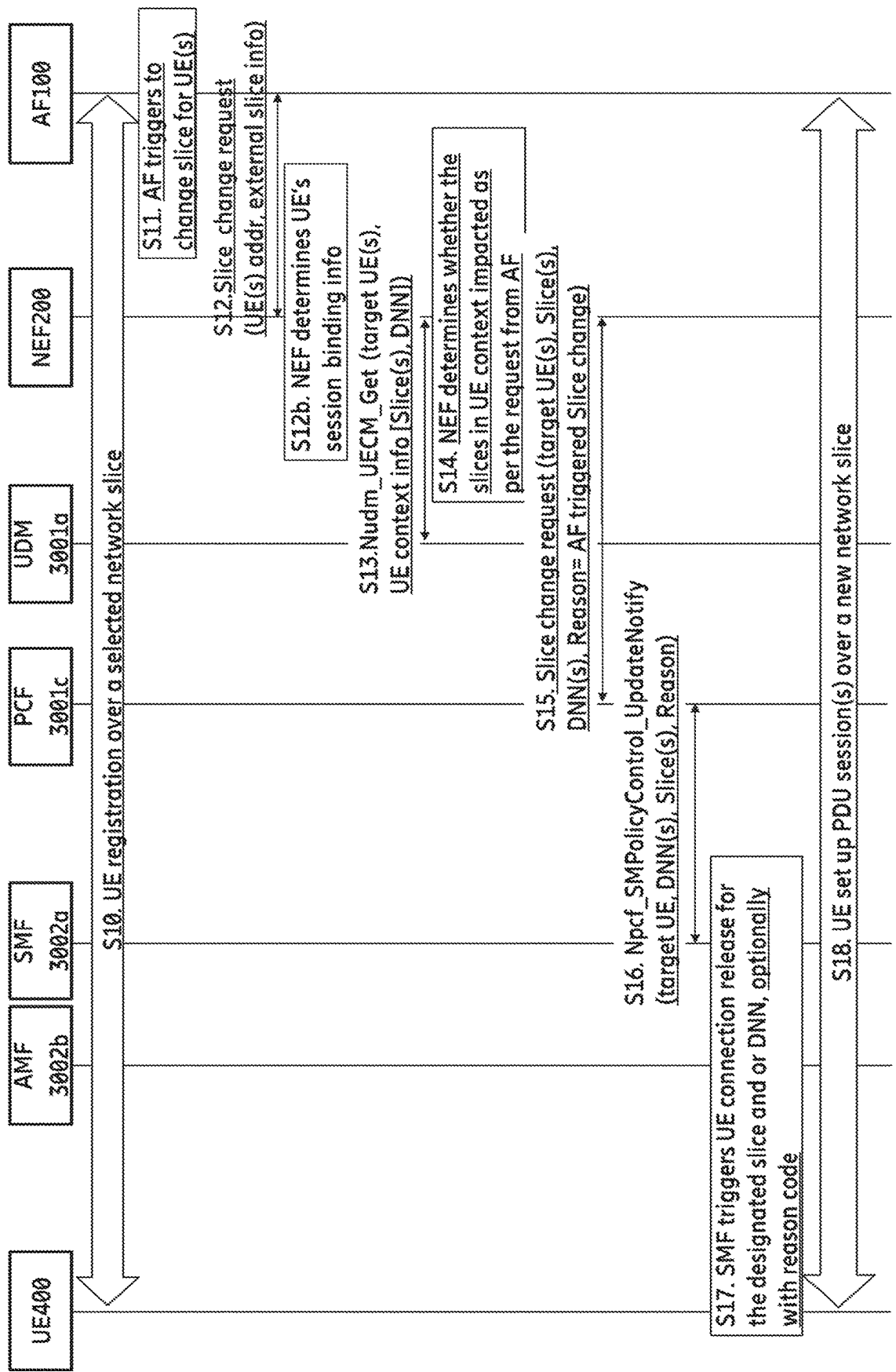
FIG. 10 is a second exemplary diagram showing more details about functions and procedures in the communication system for managing the network slice for the terminal device.

FIG. 10 is a second exemplary diagram showing more details about functions and procedures in the communication system for managing the network slice for the terminal device.

As shown in FIG. 10, the procedure to change the network slice for the terminal device relating to AF 100, NEF 200, PCF 3001*c*, SMF 3002*a*, UE 400 sequentially is illustrated. The procedure may be also named as a PCF anchored solution.

Steps S10-S14 may be the same with the steps 90-94 in the FIG. 9.

For example, NEF 200 may additionally trigger session binding discovery procedure via Nbsf interface as defined in 3GPP 23.501 V15.5.0 &23.502 V15.5.1; to get UE 400's session information, including, UE id information (e.g SUPI, GPSI), DNN, and also the PCF instance that handles the UE's data session.

In step S15, NEF 200 determines that slice "S-NSSAI=1" which UE 400 with ID of "UE1" is attached to is the source slice indicated by the AF 100 to change. NEF 200 then triggers slice change towards PCF 3001*c*, e.g. NEF 200 sends slice change request, via Npcf service to PCF 3001*c*, including UE ID: GPSI=1 or SUPI=1; Source Slice: "S-NS-SAI=1"; Target Slice: "S-NSSAI=2"; DNN: "internet"; Action indicator="Immediate"; Reason: "AF triggered slice change".

In step S16, after receiving the request from the NEF 200, PCF 3001*c* determines, based on the operator policy, the PDU session(s) to be released, e.g. SMF 3002*a* with ID of "SMF-1" shall be notified about slice change for UE 400. PCF 3001*c* sends slice change request, e.g. "Npcf_SMPolicyControl_UpdateNotify" to SMF 3002*a*, including: UE ID: GPSI=1 or SUPI=1; Source Slice: "S-NSSAI=1"; Target Slice: "S-NSSAI=2"; DNN: "internet"; Action indicator: "Immediate"; Reason: "network triggered slice change" or "AF triggered slice change".

In step S17, after receiving the request from the PCF 3001*c*, SMF 3002*a* determines, based on the operator's policy, the PDU session(s) shall be released; SMF 3002*a* triggers PDU session release procedure accordingly. SMF 3002*a* may indicate UE 400 the reason, which is "network triggered slice change" or "AF triggered slice change".

In step S18, the UE 400 then re-evaluate the application to PDU Session association with the current slice and trigger establish new PDU session (s) with new requested NSSAI, based on the latest received slice related information (e.g. allowed NSSAIs, Configured NSSAI, target NSSAIs etc.) and/or URSP/NSSP.

Figure 11:
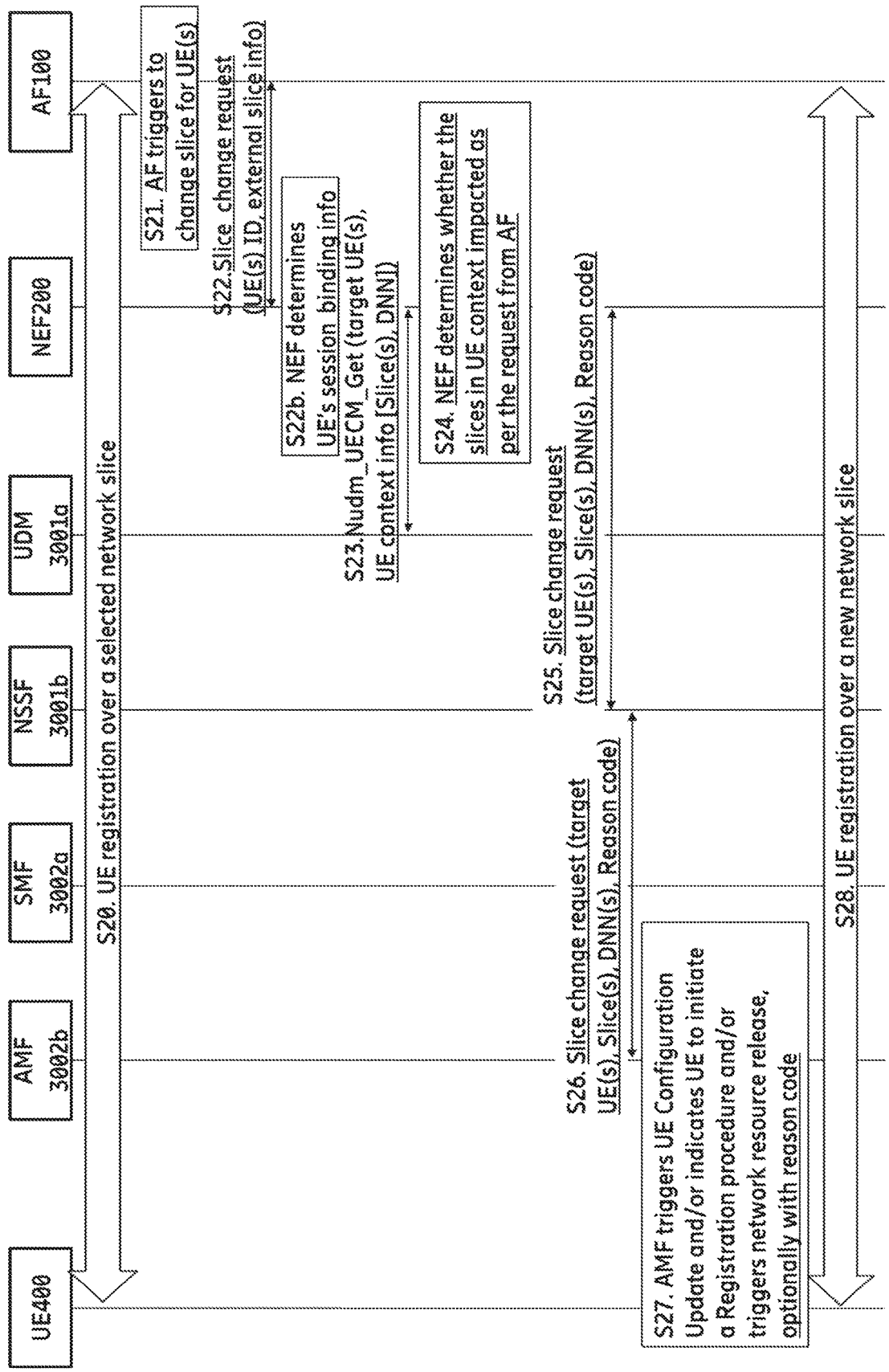
FIG. 11 is a third exemplary diagram showing more details about functions and procedures in the communication system for managing the network slice for the terminal device.

FIG. 11 is a third exemplary diagram showing more details about functions and procedures in the communication system for managing the network slice for the terminal device.

As shown in FIG. 11, the procedure to change the network slice for the terminal device relating to AF 100, NEF 200, NSSF 3001*b*, AMF 3002*b*, UE 400 sequentially is illustrated. The procedure may be also named as a NSSF anchored solution.

Steps S20-S24 may be the same as the step 90-94 in FIG. 9.

In step S25, NEF 200 determines that slice "S-NSSAI=1" which UE 400 with ID of "UE1" is attached to is the source slice indicated by the AF 100 to change. NEF 200 then triggers slice change towards NSSF 3001*b*. E.g., NEF 200 sends slice change request, via Nssf service to NSSF 3001*b*, including UE ID: GPSI=1 or SUPI=1; Source Slice: "S-NS-SAI=1"; Target Slice: "S-NSSAI=2"; DNN="internet"; Action indicator="Immediate"; Reason: "AF triggered slice change".

In step S26, after receiving the request from NEF 200, NSSF 3001*b* determines, based on the operator's policy, AMF 3002*b* with ID of "AMF-1" shall be notified about slice change for UE1& "S-NSSAI=1". This implies that when AMF 3002*b* performs network slice selection, AMF 3002*b* sends UE ID in Slice Selection request; NSSF 3001*b* keeps association between UE(s) and AMFs for the accepted slices.

NSSF 3001*b* then sends slice change request to AMF 3002*b*, including: UEID: SUPI=1; Source Slice: "S-NS-SAI=1"; Target Slice: "S-NSSAI=2"; DNN="internet"; Action indicator: "Immediate"; Reason: "network triggered slice change" or "AF triggered slice change".

Steps S27-S28 may be the same as the step 97*a* and 98 in FIG. 9.

Figure 12:
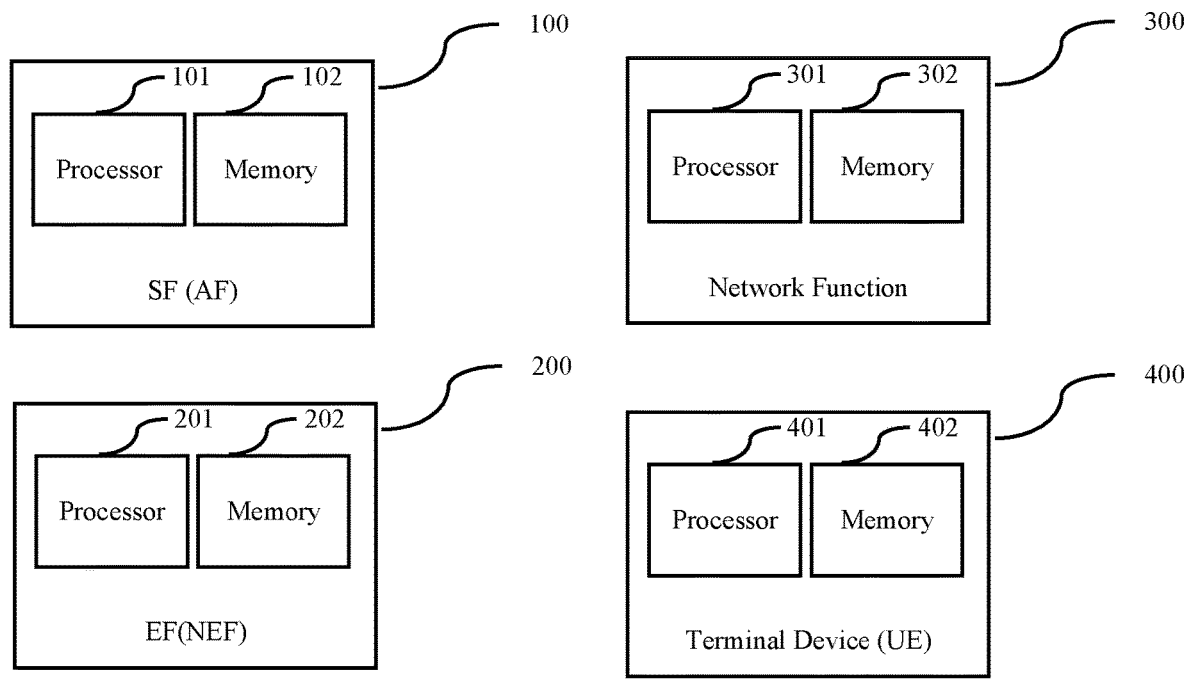
FIG. 12 is a block diagram showing apparatuses for functions/nodes in accordance with embodiments of the present disclosure.

FIG. 12 is a block diagram showing apparatuses for functions/nodes in accordance with embodiments of the present disclosure.

An apparatus for a server function 100 comprises: a processor 101; and a memory 102, containing instructions executable by the processor 101; the apparatus for the server function 100 is operative to implement the method according to any of embodiments above mentioned, such as shown in FIGS. 2, 3, 9, 10, 11.

An apparatus for an exposure function 200 comprises: a processor 201; and a memory 202, containing instructions executable by the processor 201; the apparatus for the exposure function 200 is operative to implement the method according to any of embodiments above mentioned, such as shown in FIGS. 4, 5, 6, 9, 10, 11.

An apparatus for a network function 300 comprises: a processor 301; and a memory 302, containing instructions executable by the processor 301; the apparatus for the network function 300 is operative to implement the method according to any of embodiments above mentioned, such as shown in FIGS. 7, 9, 10, 11.

An apparatus for a terminal device (UE) 400 comprises: a processor 401; and a memory 402, containing instructions executable by the processor 401; the apparatus for the terminal device 400 is operative to implement the method according to any of embodiments above mentioned, such as shown in FIGS. 8, 9, 10, 11.

The processors 101, 201, 301, 401 may be any kind of processing component, such as one or more microprocessor or microcontrollers, as well as other digital hardware, which may include digital signal processors (DSPs), special-purpose digital logic, and the like. The memories 102, 202, 302, 402 may be any kind of storage component, such as read-only memory (ROM), random-access memory, cache memory, flash memory devices, optical storage devices, etc.

Figure 13:
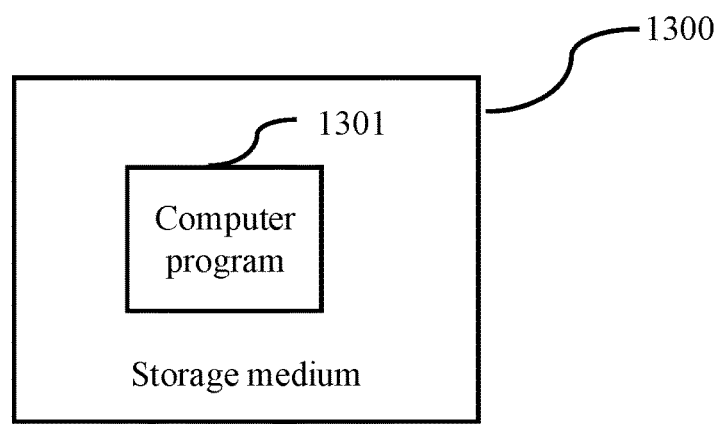
FIG. 13 is a block diagram showing a computer readable storage medium in accordance with embodiments of the present disclosure.

FIG. 13 is a block diagram showing a computer readable storage medium in accordance with embodiments of the present disclosure.

The computer readable storage medium 1300 has a computer program 1301 stored thereon, the computer program 1301 is executable by an apparatus to cause the apparatus to carry out the method according to any of embodiments above mentioned, such as shown in FIGS. 2-11.

The computer readable storage medium 1300 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives.

Figure 14:
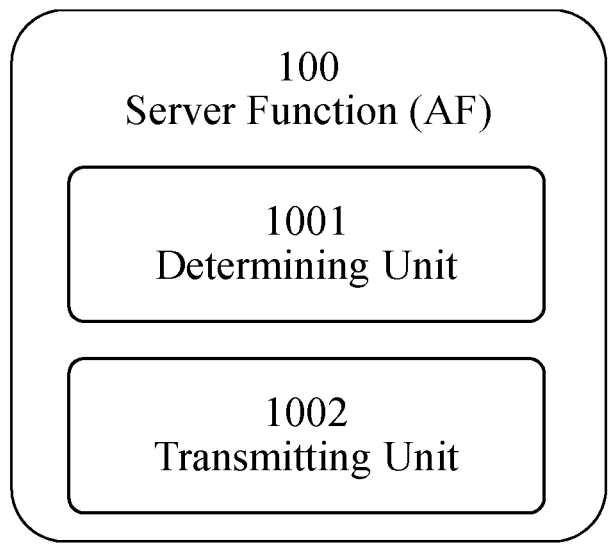
FIG. 14 is a schematic showing units of the server function, according to embodiments of the present disclosure.

FIG. 14 is a schematic showing units of the server function, according to embodiments of the present disclosure.

The apparatus for a server function (AF) 100 comprises: a determining unit 1001, configured to determine (S101) to change a network slice for a terminal device; and a transmitting unit 1002, configured to transmit (S102), to an exposure function, a request to change the network slice for the terminal device.

Figure 15:
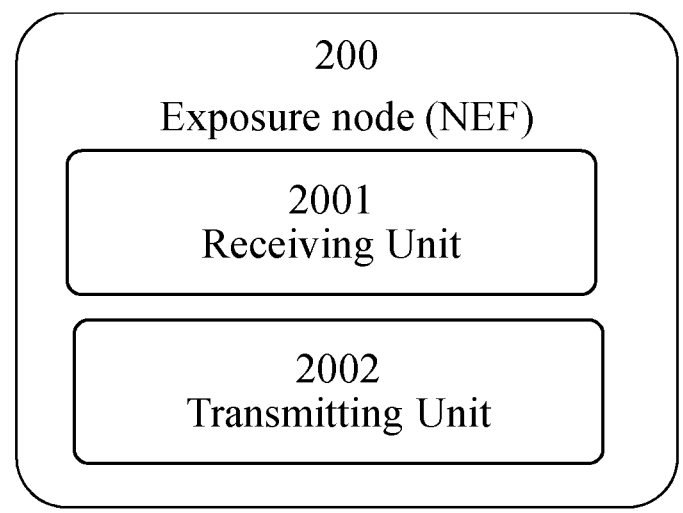
FIG. 15 is a schematic showing units of the exposure function, according to embodiments of the present disclosure.

FIG. 15 is a schematic showing units of the exposure function, according to embodiments of the present disclosure.

The apparatus for an exposure function (NEF) 200 comprises: a receiving unit, configured to receive (S201), from a server function, a first request to change a network slice for a terminal device; and a transmitting unit 2002, configured to transmit (S202), to a network function, a second request to change the network slice for the terminal device.

Figure 16:
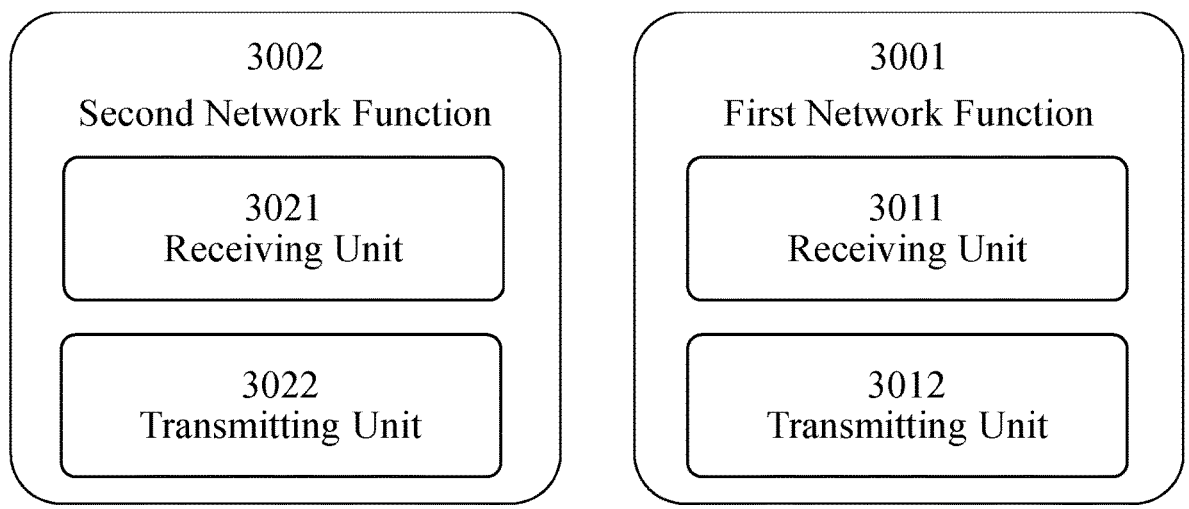
FIG. 16 is a schematic showing units of the network functions, according to embodiments of the present disclosure.

FIG. 16 is a schematic showing units of the network functions, according to embodiments of the present disclosure.

The apparatus for a first network function 3001 comprises: a receiving unit 3011, configured to receive (S301), from an exposure function, a second request to change a network slice for a terminal device; and a transmitting unit 3012, configured to transmit (S302), to another network function, a third request to change the network slice for the terminal device.

The apparatus for a second network function 3002 comprises: a receiving unit 3021, configured to receive (S401), from another network function, a third request to change a network slice for a terminal device; and a transmitting unit 3012, configured to transmit (S402), to the terminal device, a notification to change the network slice for the terminal device.

Figure 17:
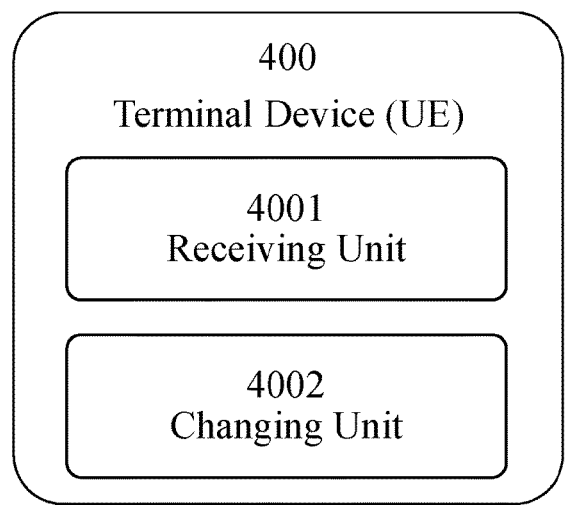
FIG. 17 is a schematic showing units of the terminal device, according to embodiments of the present disclosure.

FIG. 17 is a schematic showing units of the terminal device, according to embodiments of the present disclosure.

The apparatus for a terminal device (UE) 400 comprises: a receiving unit 4001, configured to receive (S501) a notification to change a network slice for the terminal device; and a changing unit 4002, configured to change (S502) the network slice for the terminal device.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

With these units, the server function, e.g. application function 100, exposure function, e.g. network exposure function 200, network function 300, or terminal device, e.g. user equipment 400 may not need a fixed processor or memory, any computing resource and storage resource may be arranged from at least one network node/device/entity/ apparatus in the communication system. The virtualization technology and network computing technology may be further introduced, so as to improve the usage efficiency of the network resources and the flexibility of the network.

Particularly, these network functions, e.g. application function 100, exposure function, e.g. network exposure function 200, network function 300, or terminal device, e.g. user equipment 400, may be implemented either as a network element on a dedicated hardware, as a software instance running on a dedicated hardware, or as a virtualized function instantiated on an appropriate platform, e.g. on a cloud infrastructure.

According to embodiments of the present disclosure, a method is performed at the server function to change the network slice for the terminal device. Therefore, whenever the server function finds out the current network slice situation is not suitable for the service being provided/to be provided to the terminal device, the network slice for the terminal device may be changed/updated timely.

According to embodiments of the present disclosure, the exposure function may trigger any of the network functions/ nodes, which is able to change the network slice for the terminal device.

According to embodiments of the present disclosure, the first network function 3001 may be a network function which does not manage the UE directly. The first network 3001 triggers the change of the network slice for the terminal device via the second network function 3002. The second network function 3002 may be a network function which manages the UE directly.

In general, the various exemplary embodiments of the present disclosure may be implemented in hardware or special purpose circuits, software, logic or any combination thereof. For example, some aspects may be implemented in hardware, while other aspects may be implemented in firmware or software that may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may include circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by those skilled in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

The invention claimed is:

1. A method performed at a server function, comprising:
determining to change a network slice for a group of terminal devices, wherein the change of the network slice comprises change from a source network slice to a target network slice; and
transmitting, to an exposure function, a request to change the network slice for the group of terminal devices, wherein the request includes an identifier of the group of terminal devices;
transmitting, to the exposure function, a request for updating a User Equipment, UE, Route Selection Policy, URSP, for the terminal device.

2. The method according to claim 1,
wherein the request includes external information of the network slice.

3. The method according to claim 2,
wherein the identifier comprises an external identifier;
wherein the external information of network slice comprises at least one of: an external slice type of the source network slice, or an external slice type of the target network slice;
wherein the external slice type includes at least one of: eMBB slice, URLLC slice, or eMTC slice; and
wherein eMBB refers to enhanced mobile broadband, URLLC refers to ultra reliable low latency communications, and eMTC refers to enhanced machine type communication.

4. The method according to claim 1,
wherein the exposure function comprises: a network exposure function, NEF, and
wherein the server function comprises: an application function, AF, or a service capability server/application server, SCS/AS.

5. The method according to claim 1, wherein a terminal device of the group of terminal devices comprises: a user equipment, UE.

6. A method performed at an exposure function, comprising:
receiving, from a server function, a first request to change a network slice for a group of terminal devices, wherein the change of the network slice comprises change from a source network slice to a target network slice;
receiving, from the server function, a request for updating a User Equipment, UE, Route Selection Policy, URSP, for the group of terminal device; and
transmitting, to a network function, a second request to change the network slice for the group of terminal devices, wherein the request includes an identifier of the group of terminal devices;
wherein the network function is a policy control function, PCF;
wherein a terminal device is included in a group of terminal devices;
wherein the network slice is changed for each terminal device in the group of terminal devices.

7. The method according to claim 6, further comprising:
determining an authorization of the first request.

8. The method according to claim 6, further comprising:
mapping the first request to the second request;
wherein the first request includes an external identifier of the terminal device, and external information of network slice;
wherein the external information of network slice comprises at least one of: an external slice type of the source network slice, or an external slice type of the target network slice;
wherein the external slice type includes at least one of: eMBB slice, URLLC slice, or eMTC slice; and
wherein eMBB refers to enhanced mobile broadband, URLLC refers to ultra reliable low latency communications, and eMTC refers to enhanced machine type communication;
wherein the second request includes an internal identifier of the terminal device, and internal information of network slice; and
wherein the internal information of network slice comprises at least one of: an identifier of the source network slice, an identifier of the target network slice, or a data network name, DNN.

9. The method according to claim 6, further comprising:
obtaining context information about the terminal device;
wherein the context information comprises information about at least one of:
an access and mobility management function instance, AMF instance, where the terminal device is registered with;
a session management function instance, SMF instance, where the terminal device is registered with;
a network slice, where the terminal device is attached to;
a data network name, DNN; or
subscription information.

10. The method according to claim 9,
wherein at least part of the context information is obtained from a unified data management, UDM.

11. The method according to claim 10,
wherein the subscription information is obtained from the UDM; and
wherein the subscription information comprises information about at least one of: a subscribed slice, or a subscribed data network name.

12. The method according to claim 6, further comprising:
obtaining session information about the terminal device;
wherein the session information comprises information about at least one of:
an identifier of the terminal device;
a DNN; or
a policy control function instance, PCF instance, that handles a data session of the terminal device.

13. The method according to claim 6,
wherein the second request comprises: a reason code indicating that a notification is triggered by the server function.

14. The method according to claim 13, wherein the reason code is optional.

15. An apparatus for a server function, comprising:
a processor; and
a memory, containing instructions executable by the processor;
wherein the apparatus for the server function is operative to:
- determine to change a network slice for a group of terminal devices, wherein the change of the network slice comprises change from a source network slice to a target network slice;
- transmit, to an exposure function, a request to change the network slice for the group of terminal devices, wherein the request includes an identifier of the group of terminal devices;
- transmit, to the exposure function, a request for updating a User Equipment, UE, route selection policy, URSP, for the terminal device.

16. An apparatus for an exposure function, comprising:
a processor; and
a memory, containing instructions executable by the processor;
wherein the apparatus for the exposure function is operative to:
- receive, from a server function, a first request to change a network slice for a group of terminal devices, wherein the change of the network slice comprises change from a source network slice to a target network slice;
- receive, from the server function, a request for updating a User Equipment, UE, Route Selection Policy, URSP, for the group of terminal devices; and
- transmit, to a network function, a second request to change the network slice for the terminal devices, wherein the request includes an identifier of the group of terminal devices;
wherein the network function is a policy control function, PCF;
wherein a terminal device is included in a group of terminal devices;
wherein the network slice is changed for each terminal device in the group of terminal devices.

* * * * *